United States Patent [19]

Tseng et al.

[11] Patent Number: 5,297,664

[45] Date of Patent: Mar. 29, 1994

[54] ELECTRIC CHARGING/PARKING METER

[76] Inventors: Ling-Yuan Tseng; David Tseng, both of 13772 Calle Tacuba, Saratoga, Calif. 95070

[21] Appl. No.: 904,952

[22] Filed: Jun. 26, 1992

[51] Int. Cl.$^5$ .................. G07F 15/12; G07F 17/24
[52] U.S. Cl. .................. 194/217; 194/904; 320/22
[58] Field of Search ............ 194/205, 212, 904, 217; 320/2, 22

[56] References Cited

U.S. PATENT DOCUMENTS

| 4,532,418 | 7/1985 | Meese et al. | 320/2 X |
| 4,800,328 | 1/1989 | Bolger et al. | 320/2 |
| 4,849,682 | 7/1989 | Bauer et al. | 320/15 |
| 5,168,205 | 12/1992 | Kan et al. | 320/22 |

FOREIGN PATENT DOCUMENTS

| 2158308 | 11/1985 | United Kingdom | 194/904 |
| 2178211 | 2/1987 | United Kingdom | 194/904 |

Primary Examiner—F. J. Bartuska
Attorney, Agent, or Firm—Burns, Doane, Swecker & Mathis

[57] ABSTRACT

A parking meter and an electric charging meter are combined in a single apparatus. The combined charging/parking meter may be coin-operated or may be operated using an information-bearing card such as a cash card, a debit card or an IC card. In particular, the charging/parking meter includes a device for receiving and verifying a medium of payment, a device for selecting and visibly indicating some combination of parking time and electric power to be had in exchange for the medium of payment, and a charging device for connecting to and supplying power to an electric car charger inlet. The charger/parking meter may further include a fast-charge setting device for causing the charging device to operate in a fast-charge mode when an amount of parking time selected is insufficient in accordance with a normal charging mode to supply an amount of electric power selected. In addition, the charging/parking meter may further include a current limiting device for preventing overcharging and a communication device for connecting the charging/parking meter to a remote installation. The meter may be used to read various information from a vehicle and send the information to a government entity.

3 Claims, 1 Drawing Sheet

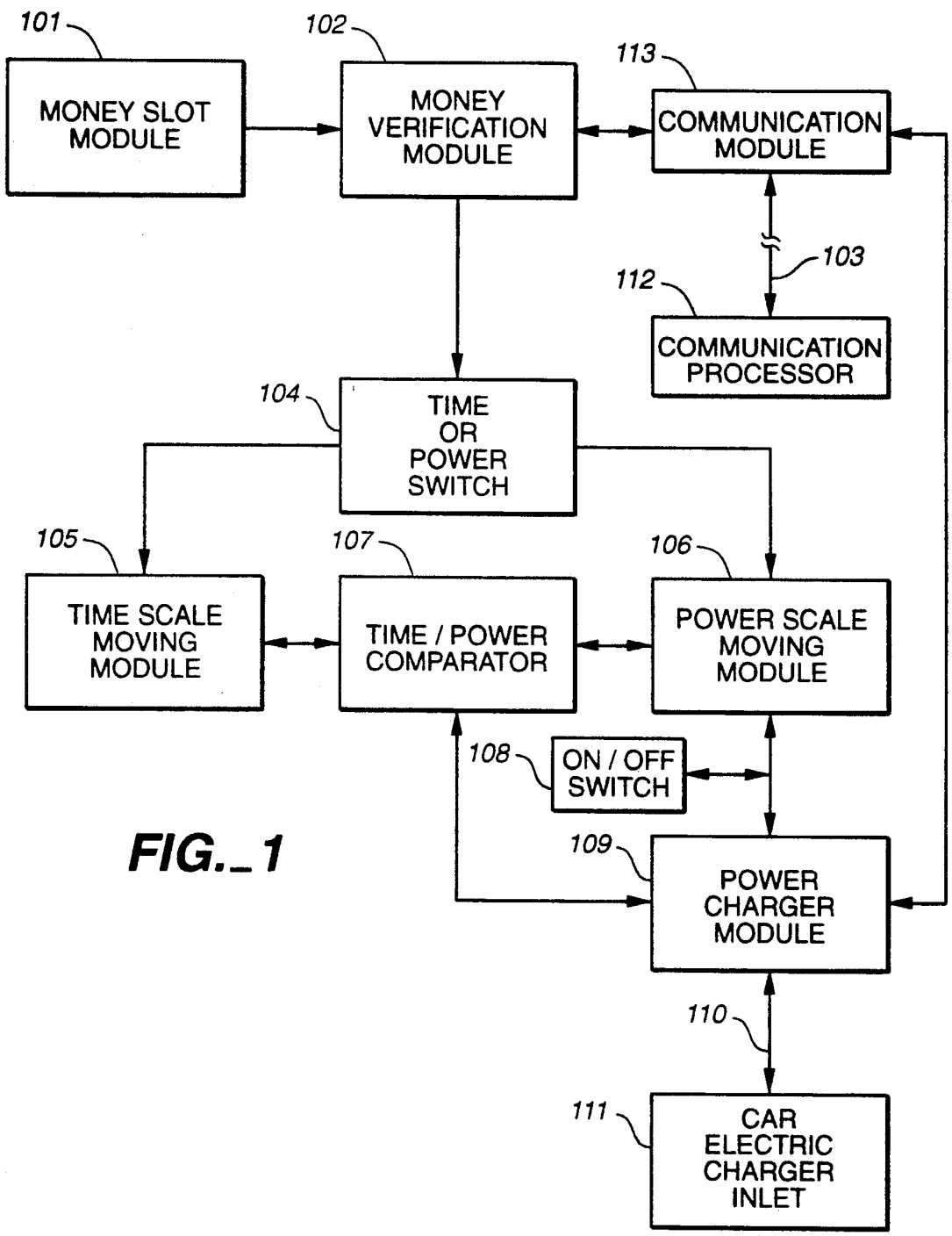
FIG._1
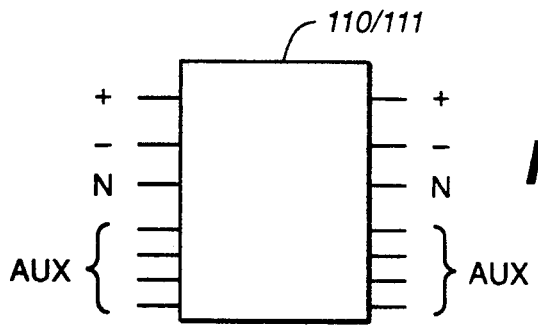
FIG._2

ELECTRIC CHARGING/PARKING METER

BACKGROUND OF THE INVENTION

1. Field of the Invention

The present invention relates to the recharging of electric cars and more particularly to an electric charging/parking meter for recharging electric cars.

2. State of the Art

In the present era of increased environmental consciousness, considerable attention is being directed toward electric cars as an alternative to conventional cars. Legislation is presently being considered in some jurisdictions that would require a percentage of all new vehicles sold to have no tail pipe emissions. Despite continuing research, however, the range of a typical electrical car is no more than about 60 miles. In many major metropolitan areas where electric cars are most needed to improve air quality, 60 miles is less than many peoples, daily commute. Even if the range of electric cars is improved, there will remain a need to provide for recharging of a car's battery away from where the car is garaged.

In contrast to conventional cars for which numerous service stations are conveniently located, for electric cars, the prospects for establishment of numerous electric service stations appear dim. For one thing, since electricity is such a commonly available commodity, the incentive for operating an electric service station is not high. Furthermore, unlike conventional cars which can have their tanks quickly filled up, the recharging of an electric car's battery takes a relatively long time. Therefore electric service stations, besides being impractical because of the amount of space that would be required to accommodate a significant number of vehicles given their charging-time requirements, would also be inconvenient for the driver who would have to wait for the battery to recharge.

The present invention addresses the foregoing difficulties.

SUMMARY OF THE INVENTION

According to the present invention, a parking meter and an electric charging meter are combined in a single apparatus. The combined charging/parking meter may be coin-operated or may be operated using an information-bearing card such as a cash card, a debit card or an IC card. In particular, the charging/parking meter includes a device for receiving and verifying a medium of payment, a device for selecting and visibly indicating some combination of parking time and electric power to be had in exchange for the medium of payment, and a charging device for connecting to and supplying power to an electric car charging inlet. The charging/parking meter may further include a fast-charge setting device for causing the charging device to operate in a fast-charge mode when an amount of parking time selected is insufficient in accordance with a normal charging mode to supply an amount of electric power selected. In addition, the charging/parking meter may further include current limiting means for preventing overcharging and a communication device for connecting the charging/parking meter to a remote installation.

The charging/parking meter addresses both the space and the time limitations referred to previously. Using the invention, cars need not be parked at a local station during charging but may be parked wherever cars are normally parked. Furthermore, charging may be performed during a time in which a car would normally be parked. As a result, drivers may go about their usual business without worrying about being stranded and without interrupting their routines for recharging.

BRIEF DESCRIPTION OF THE DRAWINGS

The present invention may be further understood from the following description in conjunction with the appended drawings. In the drawings:

FIG. 1 is a block diagram of the charging/parking meter of the present invention; and FIG. 2 is a diagram showing wiring connections of the charging cable and changer inlet of FIG. 1.

DETAILED DESCRIPTION OF THE PREFERRED EMBODIMENTS

In general terms, the present charging/parking meter provides the following two functions: (1) metering the time parked, and/or (2) metering an amount of power supplied to charge the battery of an electric car. To use the meter, a person determines the parking time needed and the power needed to recharge the electric car's battery. Money is then inserted in the meter accordingly. The charging/parking meter therefore provides optimum flexibility.

Just as gasoline cars have a gas tank level indicator, electric cars also have a power indicator showing the state of charge of the battery, or how much power is left in the battery. The unit of power is assumed in the following description to be AH (Ampere Hours), or KVA (Kilo Volt Ampere), although wattage or another suitable physical or electrical unit of measurement might be used. The charging/parking meter therefore has two indicators, a time indicator calibrated in units of quarter hours, for example, and a power indicator calibrated in units of 5 AH, for example.

In one embodiment, the charging/parking meter is coin operated the same as a normal parking meter. Coins of various values may be inserted to purchase time, or power or both. The same coin slots are used to purchase both time and power, but a knob (switch or handle) is provided for the purchaser to designate whether the particular coin being inserted is to purchase time or power.

Once the time meter has been activated, it functions in identical manner as a normal parking meter. That is, as time goes by, the meter scale goes down. Once the power meter has been activated, the driver may pull over a charging cable to his car, plug in, and begin the charging process. A switch is provided on the meter to turn on an electric charger which sits underneath the meter post, either above ground or under ground. Preferably, power is supplied to each charging/parking meter by underground cable.

Referring now to FIG. 1, the charging/parking meter includes a money slot module 101, a money verification module 102, a timer power switch 104, a time scale moving module 105, a power scale moving module 106, a time/power comparator 107, an on/off switch 108, a power charger module 109 and an electric car charger inlet 111. The charging/parking meter may also optionally include a communication line 103 whereby a communication module 113 may establish communications with a remote communication processor 112.

The money slot module 101, as with a conventional parking meter, will normally have several slots to receive different values of coins. However, this module might alternatively be a cash card reader, a debit card reader or an IC card reader to enable payment to made using one of the foregoing types of cards. A magnetic card reader may be provided for use with magnetic-strip plastic or paper cards, or an IC card reader may be provided for use with IC cards.

The money slot module 101 is connected to a money verification module 102 whose function is to verify satisfactory payment. In the case of coin payment, the function of the module is to detect if the coin inserted is genuine or not. Any of several different well-known methods of detection may be used including detection of a coin's dimensions, weight or magnetic properties. Usually, detection is performed by mechanical means. If card payment is used, then the card is first swiped in a card reader, after which the money verification module 102 captures the information read from the card and relays that information via telephone line or dedicated signal line to a designated place equipped with a computing device to verify that the card is good. More preferably, the information is sent to a communication module 113 and then the information is modulated onto the power line and sent to a communication processor 112. If the money verification module 102 is unable to verify payment, then the meter cannot be activated.

A communication line 103 may be used to perform the foregoing verification and may be a telephone line, a dedicated signal line, or, as previously mentioned, a power line used in addition for signalling purposes. Alternatively, the communication line may simply be a signal line wired to a nearby control center.

The money verification module 102 is connected to the time or power switch 104. The switch allows the purchaser to designate the money inserted for the purchase of parking time or for the purchase of power. The switch may be a mechanical lever-type handle, a flip-type switch or a push-button switch for indicating the service chosen. The money verification module 102 may include a pricing module which contains a price schedule for charging during different time periods. The rate structure will be such that an incentive exists for people to charge their cars during off-peak hours. A semiconductor real-time clock embedded inside the pricing module continuously keeps track of the time. A fixed rate schedule may be programmed inside each module, else the rate schedule may be down-loaded from a remote center via the power line, allowing flexible rate determination by the meter operator.

The time or power switch 104 is connected to the time scale moving module 105 and the power scale moving module 106. Depending on whether time or power has been selected, the time or power switch 104 activates the appropriate one of the time scale moving module 105 and the power scale moving module 106. Both the time scale moving module 105 and the power scale moving module 106 are substantially similar to one another. In the case of coin operation, the value of each inserted coin activates movement of a time scale or power scale to a next preset position. The modules 105 and 106 may therefore be mechanical devices of a type commonly employed in parking meters. Alternatively, in a plastic card payment system, a user-operated switch or dial is provided to indicate the amount of parking time and/or power needed. The power scale moving module 106 differs from the time scale moving module 105 principally in the units shown on the indicator and the formula used to convert money into power.

An important feature of the present charging/parking meter is the provision of a "turbo charge cycle" in order to accommodate the need to provide a large amount of charging energy in a short period of time. For example, a driver may need to park the car for only 15 minutes but the car's battery may be almost completely discharged. If the normal charging procedure would require 1 hour, the charging/parking meter will instead boost the charging level to that of a turbo charge cycle, therefore requiring less charging time. The described turbo charger may be installed as an option, for example on some fraction of a large number of charging/parking meter posts. Since the turbo charger entails extra hardware installation costs, the cost per power unit to the purchaser will be higher than in normal operation.

A determination as to whether the turbo charge cycle is required is made by the time/power comparator 107 which is connected to both the time scale moving module 105 and the power scale moving module 106, as well as to the power charger module 109. In a normal charging mode, the time required to supply a specified amount of power is equal to the amount of power divided by the normal charging rate. If the time/power comparator 107 determines that the required charging time is less than the amount of parking time purchased, then the charging/parking meter remains in normal mode. On the other hand if the time/power comparator 107 determines that the required charging time is greater than the amount of parking time purchased, than the time/power comparator 107 sets the power charger module 109 for turbo charging mode. A "turbo" indicator is activated to alert the purchaser that a turbo charger surcharge will be required in order to supply the designated amount of power.

Once payment has been verified and the desired amount of power has been determined, the purchaser pulls over the charging cable to his car, plugs in, and starts the charging process by turning on the switch 108. Alternatively, as described in greater detail herein after, the meter may be equipped to read certain information from the car to be charged via the power cable plugged into the socket of the car. Since this information may influence the user's selection of charging options, the meter, having first read the information, may cause some of the information to be visibly displayed, for example, how many units of electric charge are required to reach full charge. Other information displayed may include the present rate, whether turbo charge mode is needed, etc. The customer is then able to more intelligently select among the available charging options. Then, once the switch 108 has been turned on, the meter operates according to user selections, entered by a dial or by pushbuttons or by how the money has been paid.

The power charger module 109 then begins to provide power to the car's battery and continues to do so for so long as the switch 108 remains on and the power scale moving module 106 indicates that the amount of power purchased has not yet been supplied. In other words, the power charger module 109 meters the amount of power that has been supplied to the car. Once this amount matches the amount indicated on the dial scale on the power meter 106, then the power charger module 109 automatically shuts off. Alternatively, the power charger module 109 as it meters the amount of power supplied to the car may cause the indication on the dial scale of the power meter 106 to gradually decrease, indicating the amount of power left to be supplied, until the indicator reaches zero. The power charger module 109 may be housed in a box and installed underground by the side of each meter post. Alternatively, several meter posts may share a single power charger module with the metering of power supplied to the car being performed by the power scale moving module 106.

The power charger module 109 is connected by a cable 110 to the electric car charger inlet 111. The cable 110 may be wound in a spring roll that is clutch or solenoid controlled to release the cable upon verification of payment.

Safety features of the charging/parking meter are designed to eliminate the risk of shock or possibility of electrocution. For example, all charging/parking meter power lines may be wired to a central control location that performs a monitoring function for safety, security and service status. Each charging/parking meter may also be independently wired without central monitoring. In either case, the safety of the charging operation is of paramount consideration. The power charger module 109 is therefore provided with a circuit interrupter that shuts off the power charger module 109 automatically upon the occurrence of any abnormality such as an over-voltage or over-current condition. The safety of the electric car charger inlet 111 shall also be considered. The inlet socket is expected to be standardized for all models of electric cars.

Referring now to FIG. 2, preferably the inlet socket, besides providing a path for current flow to the battery, also provides for communication between the meter and the car being charged. For example, the inlet socket may be provided on both the meter side and the car side with auxiliary ports in addition to positive, negative and ground terminals. The positive and negative pins provide electrical charging current contacts, while the ground pin is for safety monitoring and control. In some instances, the negative and ground terminals may be short-circuited inside the power charger module. This precaution will enable the detection of any leakage current or voltage occurring prior to or during the charging operation so as to eliminate the possibility of electrical shock. For maximum safety, the charging cable 110 and the inlet 111 should form a male/female connection (for example, the charging cable female and the charging inlet male) such that once a plug connection is made, the possibility of physical exposure to dangerous electrical contacts is eliminated. Furthermore, the plug connection is preferably designed such that the charger module will not operate with any other type of connection, thereby preventing the improper use of the charging cable.

An attractive alternative to the foregoing arrangement is charging by a non-contact current inductance type process. One inductor mounted in a fixed location, normally on the ground, may be used to supply power to another inductor mounted on the car, normally on the bottom of the car body. Once the car has been parked at the right position and procedures analogous to those previously described have been followed, the car battery may then be charged.

The auxiliary ports may be one or more in number and may take any convenient form (metal pins, standouts, metal contact pads, or non-contacting inductive points). The auxiliary ports provide for communication of the car with the outside world. On the car side, the auxiliary ports may be connected to the car's control module, battery management module or some other fixed and/or programmed information module.

The car's control module functions to sense, monitor and record the status, history and maintenance record of various mechanical and electrical control modules. Some of this information may be vital to the charging processes. The power charger module 109 may therefore read such information prior to charging, signalling and alerting the driver and possibly totally shutting off the charger in the case of any abnormality.

The car's battery management module monitors, records and controls the battery's operation. Information recorded in the battery management module may include the discharging pattern since the last charging, or since first usage, as well as full-charge capacity and the present state of charge. Using this information, the power charger module 109 will be able to determine the best charging algorithm for the particular car being charged.

Apart from charging, the meter may also serve as part of a broader intelligence network. Fixed information associated with the specific car, such as an identification number (including model, year made, color, system operating voltage, battery capacity, etc.), or programmed information such as owner, city of registration, etc., may be read through the auxiliary ports. The information may be changed by authorized motor vehicle agencies to monitor the status of each car. The same information may be used by law enforcement agencies, municipalities, and local motor vehicle authorities to trace stolen cars, monitor traffic patterns, charge for the use of public facilities by cars registered to non-residents, etc. In contrast to charging information, this additional information may or may not always be read, may be read in whole or in part and may be read prior to commencement of the charging process or during charging.

In the case of non-charging information accessed using the auxiliary ports, the information is sent to the communication module 113 for additional processing if necessary, then modulated and sent to the remote communication processor 112 for processing and acting on the information.

The foregoing has described the principals, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without parting from the scope of the present invention as defined by the following claims.

What is claimed is:

1. A combination parking meter and electric charging meter, comprising:
   means for receiving and verifying a medium of payment;
   means for selecting and visibly indicating some combination of parking time and electric power to be had in exchange for said medium of payment;
   charging means for connecting to and supplying power to an electric car charger inlet; and
   fast-charge setting means for causing said charging means to operate in a fast-charge mode when said fast-charge setting means determines that an amount of parking time selected is insufficient in accordance with a normal charging mode to supply an amount of electric power selected.

2. The apparatus of claim 1, further comprising current limiting means for preventing overcharging.

3. The apparatus of claim 2, further comprising communication means for connecting said apparatus through a remote installation.

* * * * *